United States Patent
Li (10) Patent No.: US 12,025,876 B2
(45) Date of Patent: Jul. 2, 2024

(54) DISPLAY PANEL AND LIQUID CRYSTAL DISPLAY DEVICE

(71) Applicant: TCL CHINA STAR OPTOELECTRONICS TECHNOLOGY CO., LTD., Shenzhen (CN)

(72) Inventor: Wenfang Li, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 546 days.

(21) Appl. No.: 17/297,968

(22) PCT Filed: Mar. 31, 2021

(86) PCT No.: PCT/CN2021/084430
§ 371 (c)(1),
(2) Date: May 27, 2021

(87) PCT Pub. No.: WO2022/198702
PCT Pub. Date: Sep. 29, 2022

(65) Prior Publication Data
US 2023/0296935 A1 Sep. 21, 2023

(30) Foreign Application Priority Data
Mar. 25, 2021 (CN) .......................... 202110319871.X (51) Int. Cl.
*G02F 1/1333* (2006.01)
*G09G 3/36* (2006.01)

(52) U.S. Cl.
CPC ..... *G02F 1/133382* (2013.01); *G09G 3/3696* (2013.01); *G09G 2300/04* (2013.01);
(Continued)

(58) Field of Classification Search
CPC ............ G02F 1/133382; G09G 3/3696; G09G 2300/04; G09G 2300/0421;
(Continued)

(56) References Cited

U.S. PATENT DOCUMENTS 10,170,058 B2* 1/2019 Kang ................... G09G 3/3413
2006/0028423 A1 2/2006 Hsu et al.
(Continued)

FOREIGN PATENT DOCUMENTS

| CN | 1282009 A | 1/2001 |
|---|---|---|
| CN | 1963907 A | 5/2007 |

(Continued)

*Primary Examiner* — Andrew Sasinowski
(74) *Attorney, Agent, or Firm* — PV IP PC; Wei Te Chung; Zhigang Ma (57) ABSTRACT

A display panel and a display device are provided and relates to the display technology field. The display panel includes a temperature detection module, a timing control module, and a power management module. The timing control module identifies a real-time temperature of the display panel according to different combination signals outputted by the temperature detection module and controls the power management module to generate and output a corresponding common voltage according to the real-time temperature. The common voltage can follow a minimum flicker common voltage in real time.

20 Claims, 3 Drawing Sheets

(52) U.S. Cl.
CPC ............. *G09G 2300/0421* (2013.01); *G09G 2320/0247* (2013.01); *G09G 2320/041* (2013.01)

(58) Field of Classification Search
CPC ..... G09G 2320/0247; G09G 2320/041; G09G 3/3655; G09G 3/36
See application file for complete search history.

(56) References Cited

U.S. PATENT DOCUMENTS

| | | | | |
|---|---|---|---|---|
| 2012/0253542 | A1* | 10/2012 | Nurmi | H05B 45/44 345/82 |
| 2013/0314064 | A1* | 11/2013 | Theiler | H05B 45/50 323/282 |
| 2018/0240423 | A1* | 8/2018 | Park | G09G 3/3685 |

FOREIGN PATENT DOCUMENTS

| | | |
|---|---|---|
| CN | 103001177 A | 3/2013 |
| CN | 103295541 A | 9/2013 |
| CN | 103680456 A | 3/2014 |
| CN | 105096880 A | 11/2015 |
| CN | 109637496 A | 4/2019 |
| KR | 20080062849 A | 7/2008 |

* cited by examiner

| | 25° | 35° | 45° | 55° |
|---|---|---|---|---|
| A | H | L | L | L |
| B | H | H | L | L |
| C | H | H | H | L |

FIG. 4

DISPLAY PANEL AND LIQUID CRYSTAL DISPLAY DEVICE

RELATED APPLICATIONS

This application is a Notional Phase of PCT Patent Application No. PCT/CN2021/084430 having international filing date of Mar. 31, 2021, which claims the benefit of priority of Chinese Patent Application No. 202110319871.X filed on Mar. 25, 2021. The contents of the above applications are all incorporated by reference as if fully set forth herein in their entirety.

TECHNICAL FIELD

The present disclosure relates to the display technology field, and more particularly to a display panel and a liquid crystal display device.

BACKGROUND ART

Display devices can transform computer data into various characters, numbers, symbols, or intuitive images for display. Input tools, such as keyboards, can be used for inputting a command or data into the computers. Display content can be added, deleted, modified, and changed at any time with via hardware and software of systems. Display devices can be divided into a plasma type, a liquid crystal type, a light emitting diode, or a cathode ray tube type according to used display components.

Liquid crystal display devices (LCD devices) adopt liquid crystal materials as basic components. The liquid crystal materials are filled between two parallel plates. Arrangements of internal molecules of the liquid crystal materials are changed by voltages to achieve an objective of light shielding and light transmitting to display well-proportioned images having dark colors and light colors. When a light filtering layer having three primary colors is disposed between two plates, displaying colorful images can be implemented.

With the increasing of an operating time of a liquid crystal display device, a temperature of a display panel is also increased until the temperature reaches a saturation value. However, in a temperature increasing process of the display panel, a minimum flicker common voltage (best Vcom) of the display panel is also changed. In this situation, when a common voltage (Vcom) of the display panel remains unchanged, a difference value between the Vcom and the best Vcom is also increased. This causes the flicker of the display panel to be deteriorated, and an image quality is affected.

Technical Problem

An objective of the present disclosure is to provide a display panel and a display device to solve the technical problem that flicker of the display panel is deteriorated when a temperature of the display panel is increased.

Technical Solution

In a first aspect, the present provides a display panel including a temperature detection module, a timing control module, and a power management module. The temperature detection module is configured to obtain a real-time temperature of the display panel and output different combination signals. The combination signals at least include a first sub signal and a second sub signal. The timing control module is connected to the temperature detection module and configured to generate a corresponding common voltage control signal according to the different combination signals. The power management module is connected to the timing control module and configured to output a corresponding common voltage to the display panel according to the common voltage control signal.

In one implementation manner, the temperature detection module includes a first temperature detection circuit and a second temperature detection circuit. The first temperature detection circuit is connected to the timing control module and configured to output the first sub signal having a different voltage level state according to a compared result of the real-time temperature and a first threshold temperature. The second temperature detection circuit is connected to the timing control module and configured to output the second sub signal having a different voltage level state according to a compared result of the real-time temperature and a second threshold temperature. The first threshold temperature is smaller than the second threshold temperature.

In one implementation manner, the first temperature detection circuit includes a first resistor, a second resistor, a first temperature resistor, and a first transistor. A first terminal of the first resistor is connected to a first terminal of the second resistor and connected to a first power source signal. A second terminal of the second resistor is connected to the timing control module and one of a source electrode and a drain electrode of the first transistor. A second terminal of the first resistor is connected to a first terminal of the first temperature resistor and a gate electrode of the first transistor. A second terminal of the first temperature resistor and the other of the source electrode and the drain electrode of the first transistor are connected to a second power source signal.

In one implementation manner, the second temperature detection circuit includes a third resistor, a fourth resistor, a second temperature resistor, and a second transistor. A first terminal of the third resistor is connected to a first terminal of the fourth resistor and connected to the first power source signal. A second terminal of the fourth resistor is connected to the timing control module and one of a source electrode and a drain electrode of the second transistor. A second terminal of the third resistor is connected to a first terminal of the second temperature resistor and a gate electrode of the second transistor. A second terminal of the second temperature resistor and the other of the source electrode and the drain electrode of the second transistor are connected to the second power source signal.

In one implementation manner, the combination signals further include a third sub signal. The temperature detection module further includes a third temperature detection circuit. The third temperature detection circuit is connected to the timing control module and configured to output the third sub signal having a different voltage level state according to a compared result of the real-time temperature and a third threshold temperature. The third threshold temperature is greater than the second threshold temperature.

In one implementation manner, when the compared result shows that the real-time temperature is smaller than the first threshold temperature, the first sub signal has a high voltage level state. When the compared result shows that the real-time temperature is smaller than the second threshold temperature, the second sub signal has a high voltage level state. When the compared result shows that the real-time temperature is smaller than the third threshold temperature, the third sub signal has a high voltage level state.

In one implementation manner, when the compared result shows that the real-time temperature is greater than or equal to the first threshold temperature, the first sub signal has a low voltage level state. When the compared result shows that the real-time temperature is greater than or equal to the second threshold temperature, the second sub signal has a low voltage level state. When the compared result shows that the real-time temperature is greater than or equal to the third threshold temperature, the third sub signal has a low voltage level state.

In one implementation manner, the third temperature detection circuit includes a fifth resistor, a sixth resistor, a third temperature resistor, and a third transistor. A first terminal of the fifth resistor is connected to a first terminal of the sixth resistor and connected to a first power source signal. A second terminal of the sixth resistor is connected to the timing control module and one of a source electrode and a drain electrode of the third transistor. A second terminal of the fifth resistor is connected to a first terminal of the third temperature resistor and a gate electrode of the third transistor. A second terminal of the third temperature resistor and the other of the source electrode and the drain electrode of the third transistor are connected to a second power source signal.

In one implementation manner, a temperature coefficient of the first temperature resistor is greater than a temperature coefficient of the second temperature resistor, and a resistance value of the first resistor is equal to a resistance value of the third resistor.

In a second aspect, the present disclosure provides a liquid crystal display device, which includes the display panel in any one of the above-mentioned implementation manners.

Advantageous Effects

In the display panel and the liquid crystal display device provided by the present disclosure, the timing control module identifies the real-time temperature of the display panel according to different combination signals outputted by the temperature detection module and controls the power management module to generate and output the corresponding common voltage according to the real-time temperature. The common voltage can dynamically follow a minimum flicker common voltage and can eliminate or decrease the flicker deterioration of the display panel due to a temperature change.

DETAILED DESCRIPTION OF EMBODIMENTS

To make the objectives, technical schemes, and technical effect of the present disclosure more clearly and definitely, the present disclosure will be described in detail below by using embodiments in conjunction with the appending drawings. It should be understood that the specific embodiments described herein are merely for explaining the present disclosure but not intended to limit the present disclosure.

After long-term research, it can be found out that flicker of a liquid crystal display panel can be adjusted to be minimum when resolution of the liquid crystal display panel is increased to 8K and a temperature of the liquid crystal display panel is 25 degrees. In this situation, a common voltage and a minimum flicker voltage of the liquid crystal display panel are the same or approximately the same. However, when the temperature of the liquid crystal display panel is increased, the flicker of the liquid crystal display panel becomes more serious. For example, when the temperature of the liquid crystal display panel is 25 degrees, the minimum flicker voltage is 4.68V. When the temperature of the liquid crystal display panel is 55 degrees, the minimum flicker voltage is 4.38V but the common voltage is still 4.68V. The flicker is serious. Based on this, corresponding solutions are provided as follows.

Figure 1:
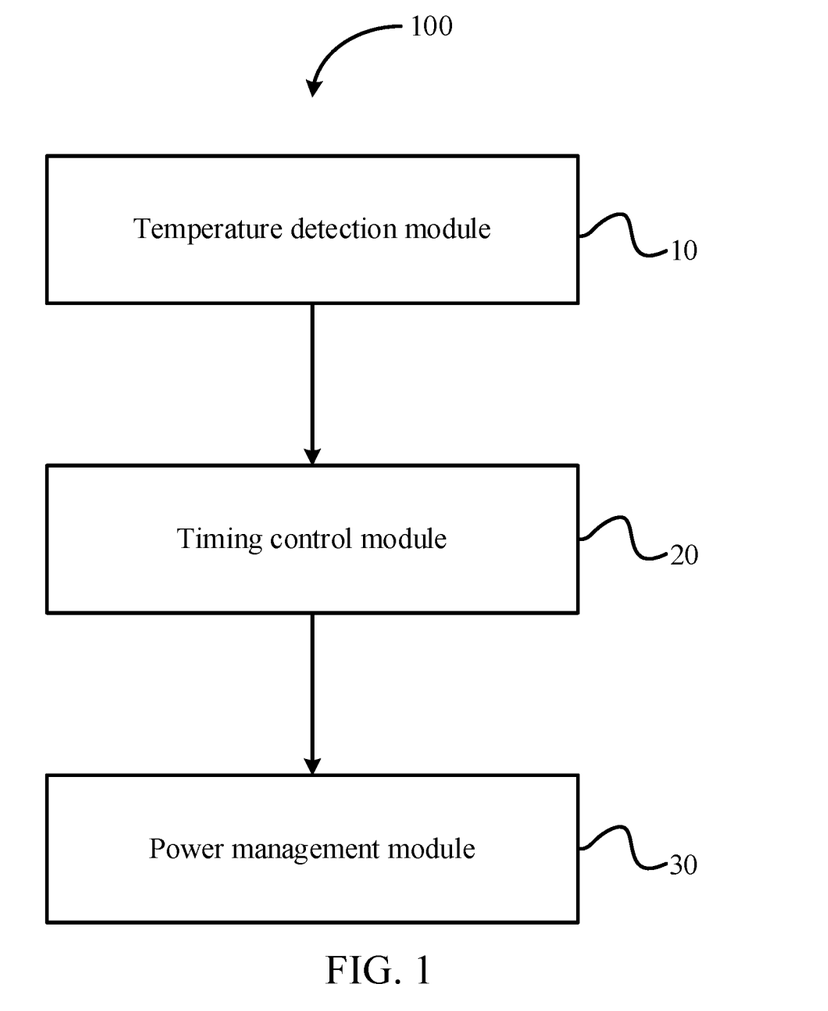
FIG. 1 illustrates a first structure diagram of a display panel provided by an embodiment of the present disclosure.

Please refer to FIG. 1 to FIG. 4. An embodiment as shown in FIG. 1 provides a display panel 100 including a temperature detection module 10, a timing control module 20, and a power management module 30. The temperature detection module 10 is configured to obtain a real-time temperature of the display panel 100 and output different combination signals. The combination signals at least include a first sub signal A and a second sub signal B. The timing control module 20 is connected to the temperature detection module 10 and configured to generate a corresponding common voltage control signal according to the different combination signals. The power management module 30 is connected to the timing control module 20 and configured to output a corresponding common voltage VCOM according to the common voltage control signal.

It can be understood that in the display panel 100 provided by the present disclosure, the timing control module 20 identifies the real-time temperature of the display panel 100 according to the different combination signals outputted by the temperature detection module 10 and controls the power management module 30 to generate and output the corresponding common voltage VCOM according to the real-time temperature. The common voltage VCOM can dynamically follow the minimum flicker common voltage and can eliminate or decrease the flicker deterioration of the display panel 100 due to a temperature change.

The power management module 30 can be but not limited to a power management integrated circuit which can generate the corresponding common voltage according to different common voltage control signals.

It should be noted that the timing control module 20 can be electrically connected to the power management module 30 via an I2C bus. The I2C bus adopts a serial line composed of a data line SDA and a clock line SCL to realize full-duplex synchronous data transmission. It can be understood that the I2C bus can be used for transmitting the common voltage control signal.

It should be noted that the temperature detection module 10 can output the first sub signal A and the second sub signal B which have different voltage levels according to the obtained real-time temperature. A voltage level state of the first sub signal A can include a low voltage level state and a high voltage level state. A voltage level state of the second sub signal B can also include a low voltage level state and a high voltage level state. The timing control module 20 can generate different common voltage control signals according to the combination signals including the first sub signal A and the second sub signal B having different voltage level states. The power management module 30 generates the specific common voltage VCOM according to the received common voltage control signal.

It should be noted that the real-time temperature and the corresponding common voltage VCOM can be linearly proportional. That is, when the real-time temperature is increased, the common voltage VCOM is continuously decreased.

Figure 2:
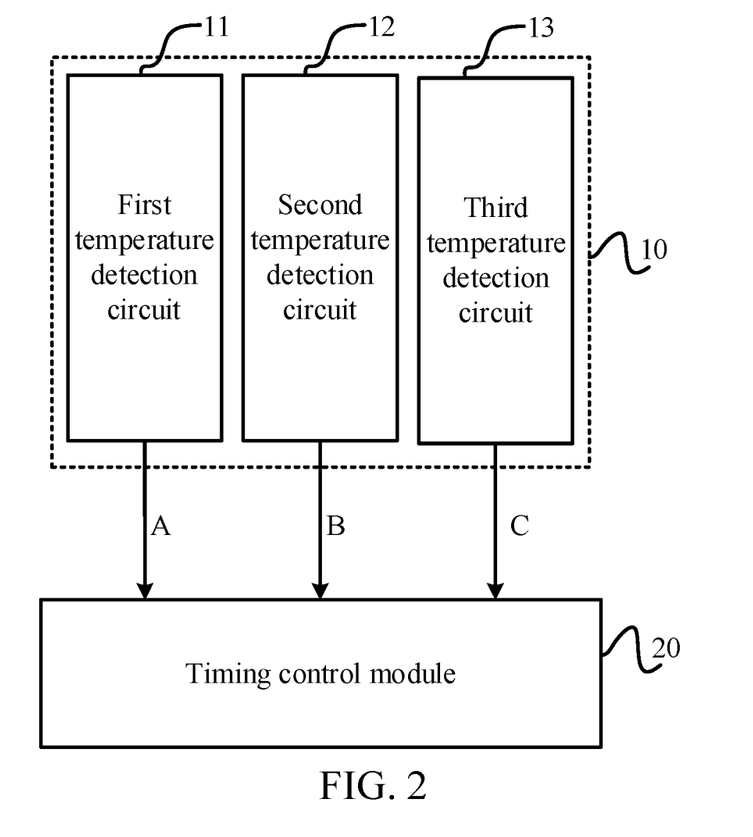
FIG. 2 a second structure diagram of a display panel provided by an embodiment of the present disclosure.

As shown in FIG. 2, in one embodiment, the temperature detection module 10 includes a first temperature detection circuit 11 and a second temperature detection circuit 12. The first temperature detection circuit 11 is connected to the timing control module 20 and configured to output the first sub signal having a different voltage level state according to a compared result of the real-time temperature and a first threshold temperature. The second temperature detection circuit 12 is connected to the timing control module 20 and configured to output the second sub signal B having a different voltage level state according to a compared result of the real-time temperature and a second threshold temperature. The first threshold temperature is smaller than the second threshold temperature.

For example, when the temperature detection module 10 detects that the real-time temperature of the display panel 100 is below 25 degrees, the first sub signal A and the second sub signal B are both in the high voltage level state because the real-time temperature does not exceed 25 degrees. In the meantime, the common voltage VCOM outputted by the power management module 30 is 4.68V. When the temperature detection module 10 detects that the real-time temperature of the display panel 100 exceeds 35 degrees, the first sub signal A is changed from the high voltage level state to the low voltage level state, and the second sub signal B still maintains the high voltage level state. In the meantime, the common voltage VCOM outputted by the power management module 30 is 4.58V.

For another example, when the temperature detection module 10 detects that the real-time temperature of the display panel 100 is below 25 degrees, the first sub signal A and the second sub signal B are both in the low voltage level state because the real-time temperature does not exceed 25 degrees. In the meantime, the common voltage VCOM outputted by the power management module 30 is 4.68V. When the temperature detection module 10 detects that the real-time temperature of the display panel 100 exceeds 35 degrees, the first sub signal A is changed from the low voltage level state to the high voltage level state, and the second sub signal B still maintains the low voltage level state. In the meantime, the common voltage VCOM outputted by the power management module 30 is 4.58V.

For another example, when the temperature detection module 10 detects that the real-time temperature of the display panel 100 is below 25 degrees, the first sub signal A and the second sub signal B are both in the high voltage level state because the real-time temperature does not exceed 25 degrees. In the meantime, the common voltage VCOM outputted by the power management module 30 is 4.68V. When the temperature detection module 10 detects that the real-time temperature of the display panel 100 exceeds 35 degrees, the first sub signal A still maintains the low voltage level state, and the second sub signal B is changed from the low voltage level state to the high voltage level state. In the meantime, the common voltage VCOM outputted by the power management module 30 is 4.58V.

As shown in FIG. 2, in one embodiment, the combination signals further includes a third sub signal C. The temperature detection module 10 further includes a third temperature detection circuit 13. The third temperature detection circuit 13 is connected to the timing control module 20 and configured to output the third sub signal C having a different voltage level state according to a compared result of the real-time temperature and a third threshold temperature. The third threshold temperature is greater than the second threshold temperature.

For example, when the temperature detection module 10 detects that the real-time temperature of the display panel 100 is below 25 degrees, the first sub signal A, the second sub signal B, and the third sub signal C are all in the high voltage level state because the real-time temperature does not exceed 25 degrees. In the meantime, the common voltage VCOM outputted by the power management module 30 is 4.68V. When the temperature detection module 10 detects that the real-time temperature of the display panel 100 exceeds 35 degrees, the first sub signal A is changed from the high voltage level state to the low voltage level state, the second sub signal B still maintains the high voltage level state, and the third sub signal C still maintains the high voltage level state. In the meantime, the common voltage VCOM outputted by the power management module 30 is 4.58V. When the temperature detection module 10 detects that the real-time temperature of the display panel 100 exceeds 45 degrees, the first sub signal A is changed from the high voltage level state to the low voltage level state, the second sub signal B is also changed from the high voltage level state to the low voltage level state, and the third sub signal C still maintains the high voltage level state. In the meantime, the common voltage VCOM outputted by the power management module 30 is 4.48V. When the temperature detection module 10 detects that the real-time temperature of the display panel 100 exceeds 55 degrees, the first sub signal A is changed from the high voltage level state to the low voltage level state, the second sub signal B is also changed from the high voltage level state to the low voltage level state, and the third sub signal C is also changed from the high voltage level state to the low voltage level state. In the meantime, the common voltage VCOM outputted by the power management module 30 is 4.38V.

For another example, when the temperature detection module 10 detects that the real-time temperature of the display panel 100 is below 25 degrees, the first sub signal A, the second sub signal B, and the third sub signal C are all in the low voltage level state because the real-time temperature does not exceed 25 degrees. In the meantime, the common voltage VCOM outputted by the power management module 30 is 4.68V. When the temperature detection module 10 detects that the real-time temperature of the display panel 100 exceeds 35 degrees, the first sub signal A is changed from the low voltage level state to the high voltage level state, the second sub signal B still maintains the low voltage level state, and the third sub signal C still maintains the low voltage level state. In the meantime, the common voltage VCOM outputted by the power management module 30 is 4.58V. When the temperature detection module 10 detects that the real-time temperature of the display panel 100 exceeds 45 degrees, the first sub signal A is changed from the low voltage level state to the high voltage level state, the second sub signal B is also changed from the low voltage level state to the high voltage level state, and the third sub signal C still maintains the low voltage level state. In the meantime, the common voltage VCOM outputted by the power management module 30 is 4.48V. When the temperature detection module 10 detects that the real-time temperature of the display panel 100 exceeds 55 degrees, the first sub signal A is changed from the low voltage level state to the high voltage level state, the second sub signal B is also changed from the low voltage level state to the high voltage level state, and the third sub signal C is also changed from the low voltage level state to the high voltage level state. In the meantime, the common voltage VCOM outputted by the power management module 30 is 4.38V.

For another example, when the temperature detection module 10 detects that the real-time temperature of the display panel 100 is below 25 degrees, the first sub signal A, the second sub signal B, and the third sub signal C are all in the low voltage level state because the real-time temperature does not exceed 25 degrees. In the meantime, the common voltage VCOM outputted by the power management module 30 is 4.68V. When the temperature detection module 10 detects that the real-time temperature of the display panel 100 exceeds 35 degrees, the first sub signal A still maintains the low voltage level state, the second sub signal B still maintains the low voltage level state, and the third sub signal C is changed from the low voltage level state to the high voltage level state. In the meantime, the common voltage VCOM outputted by the power management module 30 is 4.58V. When the temperature detection module 10 detects that the real-time temperature of the display panel 100 exceeds 45 degrees, the first sub signal A still maintains the low voltage level state, the second sub signal B is changed from the low voltage level state to the high voltage level state, and the third sub signal C is changed from the low voltage level state to the high voltage level state. In the meantime, the common voltage VCOM outputted by the power management module 30 is 4.48V. When the temperature detection module 10 detects that the real-time temperature of the display panel 100 exceeds 55 degrees, the first sub signal A is changed from the low voltage level state to the high voltage level state, the second sub signal B is also changed from the low voltage level state to the high voltage level state, and the third sub signal C is also changed from the low voltage level state to the high voltage level state. In the meantime, the common voltage VCOM outputted by the power management module 30 is 4.38V.

For another example, when the temperature detection module 10 detects that the real-time temperature of the display panel 100 is below 25 degrees, the first sub signal A, the second sub signal B, and the third sub signal C are all in the low voltage level state because the real-time temperature does not exceed 25 degrees. In the meantime, the common voltage VCOM outputted by the power management module 30 is 4.68V. When the temperature detection module 10 detects that the real-time temperature of the display panel 100 exceeds 35 degrees, the first sub signal A still maintains the low voltage level state, the second sub signal B is changed from the low voltage level state to the high voltage level state, and the third sub signal C still maintains the low voltage level state. In the meantime, the common voltage VCOM outputted by the power management module 30 is 4.58V. When the temperature detection module 10 detects that the real-time temperature of the display panel 100 exceeds 45 degrees, the first sub signal A still maintains the low voltage level state, the second sub signal B is changed from the low voltage level state to the high voltage level state, and the third sub signal C is changed from the low voltage level state to the high voltage level state. In the meantime, the common voltage VCOM outputted by the power management module 30 is 4.48V. When the temperature detection module 10 detects that the real-time temperature of the display panel 100 exceeds 55 degrees, the first sub signal A is changed from the low voltage level state to the high voltage level state, the second sub signal B is also changed from the low voltage level state to the high voltage level state, and the third sub signal C is also changed from the low voltage level state to the high voltage level state. In the meantime, the common voltage VCOM outputted by the power management module 30 is 4.38V.

Figure 3:
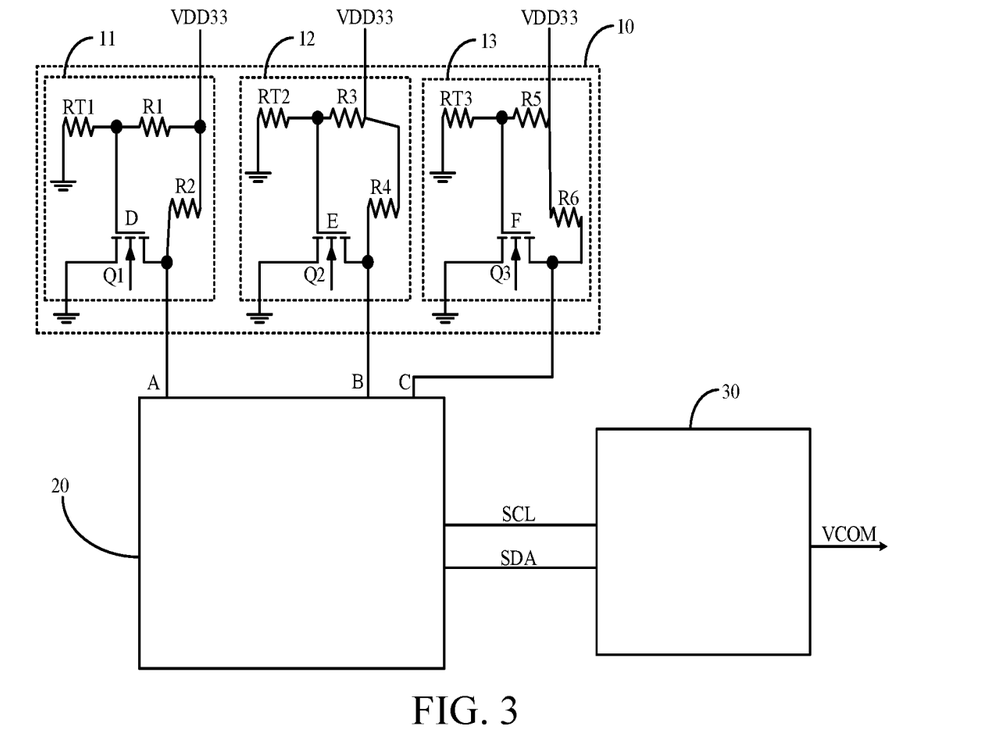
FIG. 3 a third structure diagram of a display panel provided by an embodiment of the present disclosure.

As shown in FIG. 3, in one embodiment, the first temperature detection circuit 11 includes a first resistor R1, a second resistor R2, a first temperature resistor RT1, and a first transistor Q1. A first end of the first resistor R1 is connected to a first terminal of the second resistor R2 and connected to a first power source signal VDD33. A second terminal of the second resistor R2 is connected to the timing control module 20 and one of a source electrode and a drain electrode of the first transistor Q1. A second terminal of the first resistor R1 is connected to a first terminal of the first temperature resistor RT1 and a gate electrode (i.e., a node D) of the first transistor Q1. A second terminal of the first temperature resistor RT1 and the other of the source electrode and the drain electrode of the first transistor Q1 are connected to a second power source signal.

A voltage of the first power source signal VDD33 can be but not limited to a direct current voltage of 3.3V, and it can also be any other direct current voltage value, for example, a direct current voltage of 5V.

It should be noted that a resistance value of the first resistor R1 can be double of a resistance value of the first temperature resistor RT1 at a room temperature. For example, at a room temperature of 25 degrees, the resistance value of the first resistor R1 can be 2 KΩ, and the resistance value of the first temperature resistor RT1 can be 1 KΩ. When the temperature reaches 35 degrees, the resistance value of the first temperature resistor RT1 can be raised to 3.1 KΩ.

In one embodiment, the second temperature detection circuit 12 includes a third resistor R3, a fourth resistor R4, a second temperature resistor RT2, and a second transistor Q2. A first terminal of the third resistor R3 is connected to a first terminal of the fourth resistor R4 and connected to the first power source signal VDD33. A second terminal of the fourth resistor R4 is connected to the timing control module 20 and one of a source electrode and a drain electrode of the second transistor Q2. A second terminal of the third resistor R3 is connected to a first terminal of the second temperature resistor RT2 and a gate electrode (i.e., a node E) of the second transistor T2. A second terminal of the second temperature resistor RT2 and the other of the source electrode and the drain electrode of the second transistor Q2 are connected to the second power source signal.

It should be noted that a resistance value of the third resistor R3 can be double of a resistance value of the second temperature resistor RT2 at a room temperature. For example, at a room temperature of 25 degrees, the resistance value of the first resistor R1 can be 2 KΩ, and the resistance value of the second temperature resistor RT2 can be 1 KΩ. When the temperature reaches 45 degrees, the resistance value of the first temperature resistor RT1 can be raised to 3.1 KΩ.

In one embodiment, the third temperature detection circuit 13 includes a fifth resistor R5, a sixth resistor R6, a third temperature resistor RT3, and a third transistor Q3. A first terminal of the fifth resistor R5 is connected to a first terminal of the sixth resistor R6 and connected to the first power source signal VDD33. A second terminal of the sixth resistor R6 is connected to the timing control module 20 and one of a source electrode and a drain electrode of the third transistor Q3. A second terminal of the fifth resistor R5 is connected to a first terminal of the third temperature resistor RT3 and a gate electrode (i.e., a node F) of the third transistor Q3. A second terminal of the third temperature resistor RT3 and the other of the source electrode and the drain electrode of the third transistor Q3 are connected to the second power source signal.

It should be noted that a resistance value of the fifth resistor R5 can be double of a resistance value of the third temperature resistor RT3 at a room temperature. For example, at a room temperature of 25 degrees, the resistance value of the fifth resistor R5 can be 2 KΩ, and the resistance value of the third temperature resistor RT3 can be 1 KΩ. When the temperature reaches 55 degrees, the resistance value of the third temperature resistor RT3 can be raised to 3.1 KΩ.

Figure 4:
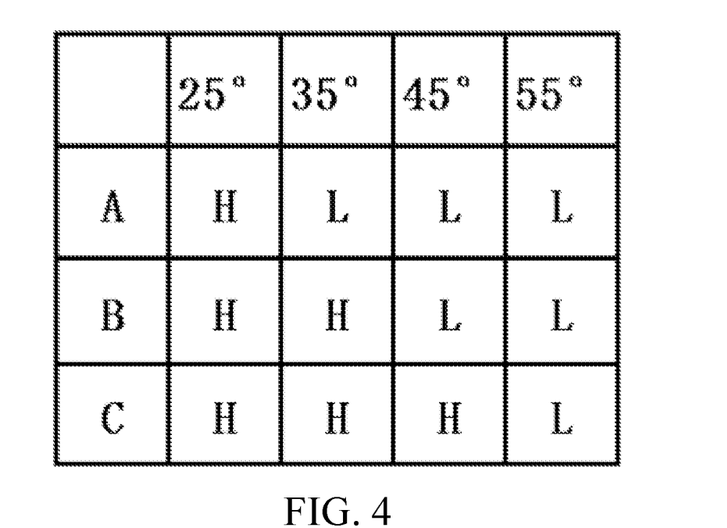
FIG. 4 illustrates a corresponding relationship diagram of a real-time temperature and voltage level states of combination signals provided by an embodiment of the present disclosure.

In one embodiment, when the compared result shows that the real-time temperature is smaller than the first threshold temperature, the first sub signal A has the high voltage level state. When the compared result shows that the real-time temperature is smaller than the second threshold temperature, the second sub signal B has the high voltage level state. When the compared result shows that the real-time temperature is smaller than the third threshold temperature, the third sub signal C has the high voltage level state.

It should be noted that the first threshold temperature can be 35 degrees, the second threshold temperature can be 45 degrees, and the third threshold temperature can be 55 degrees.

In one embodiment, when the compared result shows that the real-time temperature is greater than or equal to the first threshold temperature, the first sub signal A has the low voltage level state. When the compared result shows that the real-time temperature is greater than or equal to the second threshold temperature, the second sub signal B has the low voltage level state. When the compared result shows that the real-time temperature is greater than or equal to the third threshold temperature, the third sub signal has the low voltage level state.

It should be noted that the first threshold temperature can also be any one temperature value between 36 degrees and 44 degrees, for example, 36 degrees, 37 degrees, 38 degrees, 39 degrees, or 44 degrees. The second threshold temperature can also be any one temperature value between 46 degrees and 54 degrees, for example, 46 degrees, 47 degrees, 48 degrees, 49 degrees, or 54 degrees. The third threshold temperature can also be any one temperature value between 56 degrees and 64 degrees, for example, 56 degrees, 57 degrees, 58 degrees, 59 degrees, or 64 degrees.

For example, when the real-time temperature is 25° which is smaller than the first threshold temperature (i.e., 35°), the voltage level state of the first sub signal A, the voltage level state of the second sub signal B, and the voltage level state of the third sub signal C are all in a high voltage level state H. When the real-time temperature is greater than or equal to the first threshold temperature (i.e., 35°), the voltage level state of the first sub signal A is changed from the high voltage level state H to a low voltage level state L, the second sub signal B still maintains the high voltage level state H, and the third sub signal C still maintains the high voltage level state H. When the real-time temperature is greater than or equal to the second threshold temperature (i.e., 45°), the voltage level state of the first sub signal A is changed from the high voltage level state H to the low voltage level state L, and the second sub signal B is changed from the high voltage level state H to the low voltage level state. L, and the third sub signal C still maintain the high voltage level state H. When the real-time temperature is greater than or equal to the third threshold temperature (i.e., 45°), the voltage level state of the first sub signal A is changed from the high voltage level state H to the low voltage level state L, and the second sub signal B is changed from the high voltage level state H to the low voltage level state L, and the third sub signal C is changed from the high voltage level state H to the low voltage level state L.

In one embodiment, a temperature coefficient of the first temperature resistor RT1 is greater than a temperature coefficient of the second temperature resistor RT2, and the resistance value of the first resistor R1 is equal to the resistance value of the third resistor R3.

It should be noted that at least one of the first temperature resistor RT1, the second temperature resistor RT2, and the third temperature resistor RT3 is a positive temperature coefficient resistor. That is, when the temperature is increased, the resistance values of the first temperature resistor RT1 and the resistance values of the second temperature resistor RT2 are increased.

In one embodiment, the present disclosure provides a liquid crystal display device, which includes the display panel 100 in any one of the above-mentioned embodiments.

It can be understood that in the liquid crystal display device provided by the present disclosure, the timing control module 20 can also identify the real-time temperature of the display panel 100 according to different combination signals outputted by the temperature detection module 10 and control the power management module 30 to generate and output the corresponding common voltage VCOM according to the real-time temperature. The common voltage VCOM can dynamically follow the minimum flicker common voltage and can eliminate or decrease the flicker deterioration of the display panel 100 due to a temperature change.

In one embodiment, the liquid crystal display device can further include an X printed circuit board. The X printed circuit board is disposed in a non-display area of the liquid crystal display device. The X printed circuit board includes at least one of the first temperature resistor RT1, the second temperature resistance RT2, and the third temperature resistor RT3.

It should be understood that the present disclosure is not limited to the exemplary examples. Those skilled in the art may achieve equivalent improvements or replacements according to the above description. The equivalent improvements and replacements should be considered to belong to the protection scope of the present disclosure.

What is claimed is:

1. A display panel, comprising:
   a temperature detection module configured to obtain a real-time temperature of the display panel and output different combination signals, wherein the combination signals at least comprise a first sub signal and a second sub signal;
   a timing control module connected to the temperature detection module and configured to generate a corresponding common voltage control signal according to the different combination signals; and
   a power management module connected to the timing control module and configured to output a corresponding common voltage to the display panel according to the common voltage control signal;
   wherein the temperature detection module comprises:
   a first temperature detection circuit connected to the timing control module and configured to output the first sub signal according to a compared result of the real-time temperature and a first threshold temperature; and a second temperature detection circuit connected to the timing control module and configured to output the second sub signal according to a compared result of the real-time temperature and a second threshold temperature.

2. The display panel of claim 1, wherein
the first temperature detection circuit is configured to output the first sub signal having a different voltage level state according to the compared result of the real-time temperature and the first threshold temperature; and
the second temperature detection circuit is configured to output the second sub signal having a different voltage level state according to the compared result of the real-time temperature and the second threshold temperature, wherein the first threshold temperature is smaller than the second threshold temperature.

3. The display panel of claim 2, wherein the first temperature detection circuit comprises a first resistor, a second resistor, a first temperature resistor, and a first transistor; and
a first terminal of the first resistor is connected to a first terminal of the second resistor and connected to a first power source signal, a second terminal of the second resistor is connected to the timing control module and one of a source electrode and a drain electrode of the first transistor, a second terminal of the first resistor is connected to a first terminal of the first temperature resistor and a gate electrode of the first transistor, and a second terminal of the first temperature resistor and the other of the source electrode and the drain electrode of the first transistor are connected to a second power source signal.

4. The display panel of claim 3, wherein the second temperature detection circuit comprises a third resistor, a fourth resistor, a second temperature resistor, and a second transistor; and
a first terminal of the third resistor is connected to a first terminal of the fourth resistor and connected to the first power source signal, a second terminal of the fourth resistor is connected to the timing control module and one of a source electrode and a drain electrode of the second transistor, a second terminal of the third resistor is connected to a first terminal of the second temperature resistor and a gate electrode of the second transistor, and a second terminal of the second temperature resistor and the other of the source electrode and the drain electrode of the second transistor are connected to the second power source signal.

5. The display panel of claim 4, wherein a temperature coefficient of the first temperature resistor is greater than a temperature coefficient of the second temperature resistor, and a resistance value of the first resistor is equal to a resistance value of the third resistor.

6. The display panel of claim 2, wherein the combination signals further comprise a third sub signal, the temperature detection module further comprises a third temperature detection circuit, the third temperature detection circuit is connected to the timing control module and configured to output the third sub signal having a different voltage level state according to a compared result of the real-time temperature and a third threshold temperature, and the third threshold temperature is greater than the second threshold temperature.

7. The display panel of claim 6, wherein when the compared result shows that the real-time temperature is smaller than the first threshold temperature, the first sub signal has a high voltage level state; when the compared result shows that the real-time temperature is smaller than the second threshold temperature, the second sub signal has a high voltage level state; and
when the compared result shows that the real-time temperature is smaller than the third threshold temperature, the third sub signal has a high voltage level state.

8. The display panel of claim 6, wherein when the compared result shows that the real-time temperature is greater than or equal to the first threshold temperature, the first sub signal has a low voltage level state;
when the compared result shows that the real-time temperature is greater than or equal to the second threshold temperature, the second sub signal has a low voltage level state; and
when the compared result shows that the real-time temperature is greater than or equal to the third threshold temperature, the third sub signal has a low voltage level state.

9. The display panel of claim 6, wherein the third temperature detection circuit comprises a fifth resistor, a sixth resistor, a third temperature resistor, and a third transistor; and
a first terminal of the fifth resistor is connected to a first terminal of the sixth resistor and connected to a first power source signal, a second terminal of the sixth resistor is connected to the timing control module and one of a source electrode and a drain electrode of the third transistor, a second terminal of the fifth resistor is connected to a first terminal of the third temperature resistor and a gate electrode of the third transistor, and a second terminal of the third temperature resistor and the other of the source electrode and the drain electrode of the third transistor are connected to a second power source signal.

10. A liquid crystal display device, comprising a display panel, the display panel comprising:
a temperature detection module configured to obtain a real-time temperature of the display panel and output different combination signals, wherein the combination signals at least comprise a first sub signal and a second sub signal;
a timing control module connected to the temperature detection module and configured to generate a corresponding common voltage control signal according to the different combination signals; and
a power management module connected to the timing control module and configured to output a corresponding common voltage to the display panel according to the common voltage control signal;
wherein the temperature detection module comprises:
a first temperature detection circuit connected to the timing control module and configured to output the first sub signal according to a compared result of the real-time temperature and a first threshold temperature; and
a second temperature detection circuit connected to the timing control module and configured to output the second sub signal according to a compared result of the real-time temperature and a second threshold temperature.

11. The liquid crystal display device of claim 10, wherein the liquid crystal display device further comprises an X printed circuit board, and a portion of the temperature detection module is disposed in the X printed circuit board.

12. The liquid crystal display device of claim 11, wherein the first temperature detection circuit is configured to output the first sub signal having a different voltage level state according to the compared result of the real-time temperature and the first threshold temperature; and the second temperature detection circuit is configured to output the second sub signal having a different voltage level state according to the compared result of the real-time temperature and the second threshold temperature, wherein the first threshold temperature is smaller than the second threshold temperature.

13. The liquid crystal display device of claim 12, wherein the first temperature detection circuit comprises a first resistor, a second resistor, a first temperature resistor, and a first transistor; and a first terminal of the first resistor is connected to a first terminal of the second resistor and connected to a first power source signal, a second terminal of the second resistor is connected to the timing control module and one of a source electrode and a drain electrode of the first transistor, a second terminal of the first resistor is connected to a first terminal of the first temperature resistor and a gate electrode of the first transistor, and a second terminal of the first temperature resistor and the other of the source electrode and the drain electrode of the first transistor are connected to a second power source signal.

14. The liquid crystal display device of claim 13, wherein the second temperature detection circuit comprises a third resistor, a fourth resistor, a second temperature resistor, and a second transistor; and a first terminal of the third resistor is connected to a first terminal of the fourth resistor and connected to the first power source signal, a second terminal of the fourth resistor is connected to the timing control module and one of a source electrode and a drain electrode of the second transistor, a second terminal of the third resistor is connected to a first terminal of the second temperature resistor and a gate electrode of the second transistor, and a second terminal of the second temperature resistor and the other of the source electrode and the drain electrode of the second transistor are connected to the second power source signal.

15. The liquid crystal display device of claim 14, wherein a temperature coefficient of the first temperature resistor is greater than a temperature coefficient of the second temperature resistor, and a resistance value of the first resistor is equal to a resistance value of the third resistor.

16. The liquid crystal display device of claim 12, wherein the combination signals further comprise a third sub signal, the temperature detection module further comprises a third temperature detection circuit, the third temperature detection circuit is connected to the timing control module and configured to output the third sub signal having a different voltage level state according to a compared result of the real-time temperature and a third threshold temperature, and the third threshold temperature is greater than the second threshold temperature.

17. The liquid crystal display device of claim 16, wherein when the compared result shows that the real-time temperature is smaller than the first threshold temperature, the first sub signal has a high voltage level state;

when the compared result shows that the real-time temperature is smaller than the second threshold temperature, the second sub signal has a high voltage level state; and when the compared result shows that the real-time temperature is smaller than the third threshold temperature, the third sub signal has a high voltage level state.

18. The liquid crystal display device of claim 16, wherein when the compared result shows that the real-time temperature is greater than or equal to the first threshold temperature, the first sub signal has a low voltage level state;

when the compared result shows that the real-time temperature is greater than or equal to the second threshold temperature, the second sub signal has a low voltage level state; and when the compared result shows that the real-time temperature is greater than or equal to the third threshold temperature, the third sub signal has a low voltage level state.

19. The liquid crystal display device of claim 16, wherein the third temperature detection circuit comprises a fifth resistor, a sixth resistor, a third temperature resistor, and a third transistor; and a first terminal of the fifth resistor is connected to a first terminal of the sixth resistor and connected to a first power source signal, a second terminal of the sixth resistor is connected to the timing control module and one of a source electrode and a drain electrode of the third transistor, a second terminal of the fifth resistor is connected to a first terminal of the third temperature resistor and a gate electrode of the third transistor, and a second terminal of the third temperature resistor and the other of the source electrode and the drain electrode of the third transistor are connected to a second power source signal.

20. The liquid crystal display device of claim 11, wherein the X printed circuit board is disposed in a non-display area of the liquid crystal display device.

* * * * *